(12) United States Patent
Ha et al.

(10) Patent No.: US 10,100,979 B2
(45) Date of Patent: Oct. 16, 2018

(54) LIQUID AIR AS ENERGY STORAGE

(75) Inventors: Bao Ha, San Ramon, CA (US);
Jean-Renaud Brugerolle, Neuchatel (CH)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 1997 days.

(21) Appl. No.: 12/971,234

(22) Filed: Dec. 17, 2010

(65) Prior Publication Data

US 2012/0151961 A1    Jun. 21, 2012

(51) Int. Cl.
*F25J 1/02*          (2006.01)
*F17C 9/04*          (2006.01)
(Continued)

(52) U.S. Cl.
CPC .............. *F17C 5/06* (2013.01); *F02C 6/14* (2013.01); *F17C 9/04* (2013.01); *F17C 2221/031* (2013.01); *F17C 2223/0161* (2013.01); *F17C 2223/033* (2013.01); *F17C 2223/046* (2013.01); *F17C 2225/0123* (2013.01); *F17C 2225/035* (2013.01); *F17C 2227/0135* (2013.01); *F17C 2227/0185* (2013.01); *F17C 2227/0311* (2013.01); *F17C 2227/0327* (2013.01); *F17C 2227/0393* (2013.01); *F17C 2260/046* (2013.01); *F17C 2265/022* (2013.01); *F17C 2265/05* (2013.01); *F17C 2270/0581* (2013.01)

(58) Field of Classification Search
CPC ......... F25C 2260/046; F02C 6/14–6/16; F17C 9/04; F17C 2221/031; F25J 1/0012
See application file for complete search history.

(56) References Cited

U.S. PATENT DOCUMENTS 5,060,480 A * 10/1991 Saulnier .................. F25J 1/0017
                                                         62/50.2
2008/0216510 A1    9/2008 Vandor et al.
2009/0282840 A1 * 11/2009 Chen ..................... F01D 15/005
                                                         62/50.3

FOREIGN PATENT DOCUMENTS

DE         2604304 A1 *  8/1977  ............. F01K 25/10
JP       11-343865 A    12/1999
                        (Continued)

OTHER PUBLICATIONS

English translation of DE 2604304 A1, provided by Espacenet. Jun. 2018.*

*Primary Examiner* — Tareq Alosh
(74) *Attorney, Agent, or Firm* — Justin K. Murray

(57) ABSTRACT

A method of liquid air energy storage is provided. This method includes liquefying and storing air to form a stored liquid air during a first period of time; during a second period of time, introducing a compressed air stream into a cryogenic system, wherein the cryogenic system comprises at least one cold compressor, and at least one heat exchanger. The method includes producing a first exhaust stream and a second exhaust stream. The method also includes vaporizing at least part of the stored liquid air stream in the heat exchanger, thereby producing a first high pressure compressed air stream, then combining the first high pressure compressed air stream, the first exhaust stream and the second exhaust stream to form a combined exhaust stream, heating the combined exhaust stream, then expanding the heated combined exhaust stream in an expansion turbine to produce power.

17 Claims, 9 Drawing Sheets

(51) Int. Cl.
*F17C 5/06* (2006.01)
*F02C 6/14* (2006.01)

(56) References Cited

FOREIGN PATENT DOCUMENTS

| | | |
|---|---|---|
| JP | 2000-130185 A | 5/2000 |
| JP | 2001141380 A | 5/2001 |
| JP | 2001-193483 A | 7/2001 |
| JP | 2002-339760 A | 11/2002 |

* cited by examiner

LIQUID AIR AS ENERGY STORAGE

BACKGROUND

Electric power demand varies greatly during the day. The consumption that generates the demand is at the highest in the day time when industrial activities are also at the highest level. The demand is reduced to its minimum during the night time when less power is needed for lighting and when other industrial activities are also at the lowest level. The wide variations of daily power demand is also influenced by low consumption during weekends when less power is needed due to reduced industrial or business activities. Seasonal effects such as high load for air conditioning during the hot summer seasons or high heating loads in cold winter months also have additional impacts on the levels of power peaks or power off-peaks. This wide fluctuation is well known and utility companies must cope with it by providing spare capacity on the power grid to accommodate higher demand periods, and by having equipment configuration such that power blocks or generating units are capable of being taken off line when demand drops.

Coal power plants and nuclear power plants, typically low cost fuel power plants, are relatively slow in capacity adjustment and load adaptation due to heavy equipment's inertia or safety constraints. For this reason, they are usually operated as base load plants to satisfy the core of the requirement.

When power demand increases, backup peak shaving gas turbines, operated on relatively costly natural gas, can be started to keep up with the demand. It is obvious that the backup equipment must be able to get on stream very quickly because the demand peaks can occur quite rapidly and usually, instantaneously. It is also clear that, mainly because of economic reasons, the backup equipment cost must be minimized since they are only needed for short durations and not permanently. Gas turbines for base load plants are usually equipped with combined cycle to maximize the overall cycle efficiency. Steam boiler and condensing steam turbines of the combined cycle are high cost items and require relatively long time, in a matter of several hours, to be fully on stream. Because of those shortcomings, peak shaving gas turbines are simple cycle, not equipped with combined cycle, to yield the lowest investment cost per kW installed. Therefore the efficiency of the peak shaving gas turbine must be compromised.

The fluctuations of the power demand can be smoothed out by providing an energy storage system: power is stored during the low demand periods and disbursed back to the grid during the high demand periods. A typical example of this setup is a hydraulic water pumping system: the surplus of power during the off-peak periods can be used to drive water pumps to send water from a low basin reservoir to a reservoir located at a higher elevation. When power demand increases, this water is returned to the low elevation reservoir by sending it to hydraulic turbines to generate supplemental electric power. The ramp-up is quite fast for this system. However, this setup is of course not applicable to most power plants since it requires an expensive infrastructure using high and low elevation reservoirs along with multiple large hydraulic turbines. In addition to the high global investment cost, the recovery, defined as the ratio of electricity output over the electricity input, is only in the range of about 60% due to the fact that the reservoirs are likely to be at remote locations such that transmission line losses can be quite high and the efficiencies of the pumps and hydraulic turbines are in the range of only about 70%.

Therefore an efficient and economical process of storing energy is desirable to address the issue of power demand fluctuations.

More and more power generation plants are being built with combustion gas turbine technology. Because of environmental issues, coal based power plants with gasification technology (IGCC Integrated Gasification Combined Cycle) are being built or selected for several projects. In the regions of the world where natural gas is available at relatively low cost, combined cycle natural gas power plant for base load operation is the technology of choice. Gas turbine concept by itself is not very efficient since about 50% of the turbine's power is wasted to compress the air for the combustion and expansion. However, the gas turbine cycle efficiency is improved significantly by adding a steam combined cycle on the turbine's exhaust gas: the waste heat of the exhaust gas is used to heat and vaporized water to form high pressure steam which is then expanded in steam turbines to generate additional power. The combined cycle concept is widely used today in the power generation industry. However, because of the complexity and the high cost of the multiple pressure heat recovery steam generation system (HRSG) and the steam turbines, and the heavy infrastructure of the very large cooling tower for the steam condensing circuit, the steam combined cycle can only be justified economically for plants larger than about 50 MW or even 100 MW. Plant size can be smaller in case of cogeneration when clients are available to purchase steam produced by the facility and to partially pay for the cost of the steam system. Because of this economic constraint, many small plants are operated based on a simple cycle concept, i.e. no combined cycle, with significant penalty on the cycle efficiency. Gas turbine vendors are implementing several improvements to the gas turbine technology in order to reduce the impact of poor efficiency such as increasing pressure ratio thus reducing exhaust temperature, or improving turbine's blade heat resistance to accommodate higher inlet temperature or using recuperated gas turbine approach. However those changes only result in smaller incremental improvement to the process efficiency. Therefore another approach less costly than the steam combined cycle capable of improving the efficiency of the gas turbine power generation system is highly desirable especially for the small and medium size plant application.

When power demand increases, backup peak shaving gas turbines, operated on relatively costly natural gas, can be started to keep up with the demand. It is obvious that the backup equipment must be able to get on stream very quickly because the demand peaks can occur quite rapidly and usually, instantaneously. It is also clear that, mainly because of economic reasons, the backup equipment cost must be minimized since they are only needed for short durations and not permanently. Gas turbines for base load plants are usually equipped with combined cycle to maximize the overall cycle efficiency. Steam boiler and condensing steam turbines of the combined cycle are high cost items and require relatively long time, in a matter of several hours, to be fully on stream. Because of those shortcomings, peak shaving gas turbines are simple cycle, not equipped with combined cycle, to yield the lowest investment cost per kW installed. Therefore the efficiency of the peak shaving gas turbine must be compromised.

Atmospheric air is a potential candidate for the medium used for energy storage. For example, air can be compressed during off-peak periods to higher pressure and stored in large underground cavern created by solution mining. During peak load periods, pressurized air of the storage can be heated by combusting natural gas to high temperature then expanded in gas turbine for power recovery. The efficiency of the power recovery depends upon the type of compression used to compress the air: adiabatic, diabatic or isothermal. This concept is simple but, similar to the water pumping scheme, requires important capital expenditure for the infrastructure. Site locations in case of mining solution are usually very remote.

To minimize the storage size and the associated cost of compressed air system, air can be liquefied by cryogenic technique and stored economically in large quantity in conventional storage tank. This air, in liquid form, can be vaporized and transformed into gaseous form to restore the compressed air needed for power generation. This technique is promising because it facilitates the compress air energy storage approach without the high cost associated with the underground cavern at remote locations. A facility for air liquefaction can be easily deployed near the main users like large cities. The technology of air liquefier and cryogenic storage are very well known and can be implemented quickly and reliably. However, several technical issues must be resolved before this approach can be used economically.

An object of this invention is to provide a technique of using liquid air to store energy. Liquefaction of air requires energy input, the specific power required to liquefy the air is about 0.5 kWh/Nm3. The liquefaction power can be improved slightly at the expense of higher investment cost for the equipment. This energy input must be recovered efficiently in the vaporization step otherwise the overall process efficiency will suffer. Therefore it is desirable to provide an efficient process for liquid air vaporization.

Considering that the liquefaction is an energy intensive process, it is advantageous to avoid this liquefaction during the peak load periods where power cost is at the premium. Therefore liquefaction during off-peak periods, for example at night time, will maximize the cost effectiveness of the concept. Power consumption for equipment such as compressors in the vaporization step must be kept at a minimum.

One potential technique of reducing power consumption of equipment is to utilize the cold or refrigeration supplied by cryogenic liquid of the cold compression process. Cold compression reduces the power consumption of the compressor significantly because the inlet temperature of the compressor is at very low level, usually in the range of −180° C. to −60° C. However, the main penalty of the cold compression is that the heat generated by the compression, even quite low at cryogenic level, must be evacuated at that cryogenic temperature level such that the required refrigeration will adversely effect the overall power consumption. In case the source of refrigeration available for the heat removal is a low cost cryogenic liquid produced inexpensively during off-peaks then cold compression becomes quite attractive.

This invention relates to an improved technique of using liquid air as the energy storage medium. Liquid air produced and stored in off-peak periods can be restored to compressed air under high pressure by an efficient vaporization process assisted with cold compression technology. The compressed air is then heated and expanded in a compressed air combined cycle to generate additional power in peak periods and to improve the efficiency of the gas turbine without a costly steam combined cycle.

The use of this invention can extend the concept of combined cycle to medium and small power gas turbine power generating units without the high cost and slow response of the traditional steam turbine combined cycle.

SUMMARY

A method of liquid air energy storage is described. This method includes liquefying and storing air to form a stored liquid air during a first period of time. The method also includes during a second period of time, introducing a compressed air stream (108) into a cryogenic system, wherein the cryogenic system comprises at least one cold compressor, and at least one heat exchanger. The method includes cooling the compressed air stream (108) within the heat exchanger producing a first cooled compressed air stream and a second cooled compressed air stream. The method includes further cooling at least a portion of the first cooled compressed air stream, thereby producing a further cooled compressed air (115).

In various combinations, the current method may include removing the further cooled compressed air (115) and compressing it in either one cold compressor (124) or two cold compressors in series (124, 126); or the current method may include removing the second cold compressed air stream (109) and compressing it in either one cold compressor (110) or two cold compressors in series (110, 123). Hence, in various embodiments, there may be between one cold compressor and four cold compressors in any possible combination. Illustrative embodiments follow.

The method includes performing at least one of steps e) and f). Step e) includes compressing at least a portion of the further cooled compressed air by a first cold compressor (124), or compressing at least a portion of the further cooled compressed air by a first cold compressor (124) thereby producing a first cold compressor exhaust stream (121), cooling the first cold compressor exhaust stream in the heat exchanger (106), thereby producing a first intermediate cooled compressor exhaust stream (125); introducing the first intermediate cooled compressor exhaust stream into a third cold compressor (126), in series with the first cold compressor, thereby producing a first exhaust stream (121). Step f) includes compressing at least a portion of the second cooled compressed air (109) by a second cold compressor (110), or compressing at least a portion of the second cooled compressed air (109) by a second cold compressor (110) thereby producing a second cold compressor exhaust stream (111), warming the second cold compressor exhaust stream in the heat exchanger, thereby producing an intermediate warmed compressor exhaust stream (112); introducing the second warmed compressor exhaust stream into a fourth cold compressor (113), in series with the second cold compressor, thereby producing a second exhaust stream (114). The method also includes vaporizing at least part of the stored liquid air stream (105) in the heat exchanger (106), thereby producing a first high pressure compressed air stream (107). The method includes combining the first high pressure compressed air stream (107), the first exhaust stream (121) and the second exhaust stream (114) to form a combined exhaust stream (122), heating the combined exhaust stream, then expanding the heated combined exhaust stream in an expansion turbine (603) to produce power.

DESCRIPTION OF PREFERRED EMBODIMENTS

Figure 1:
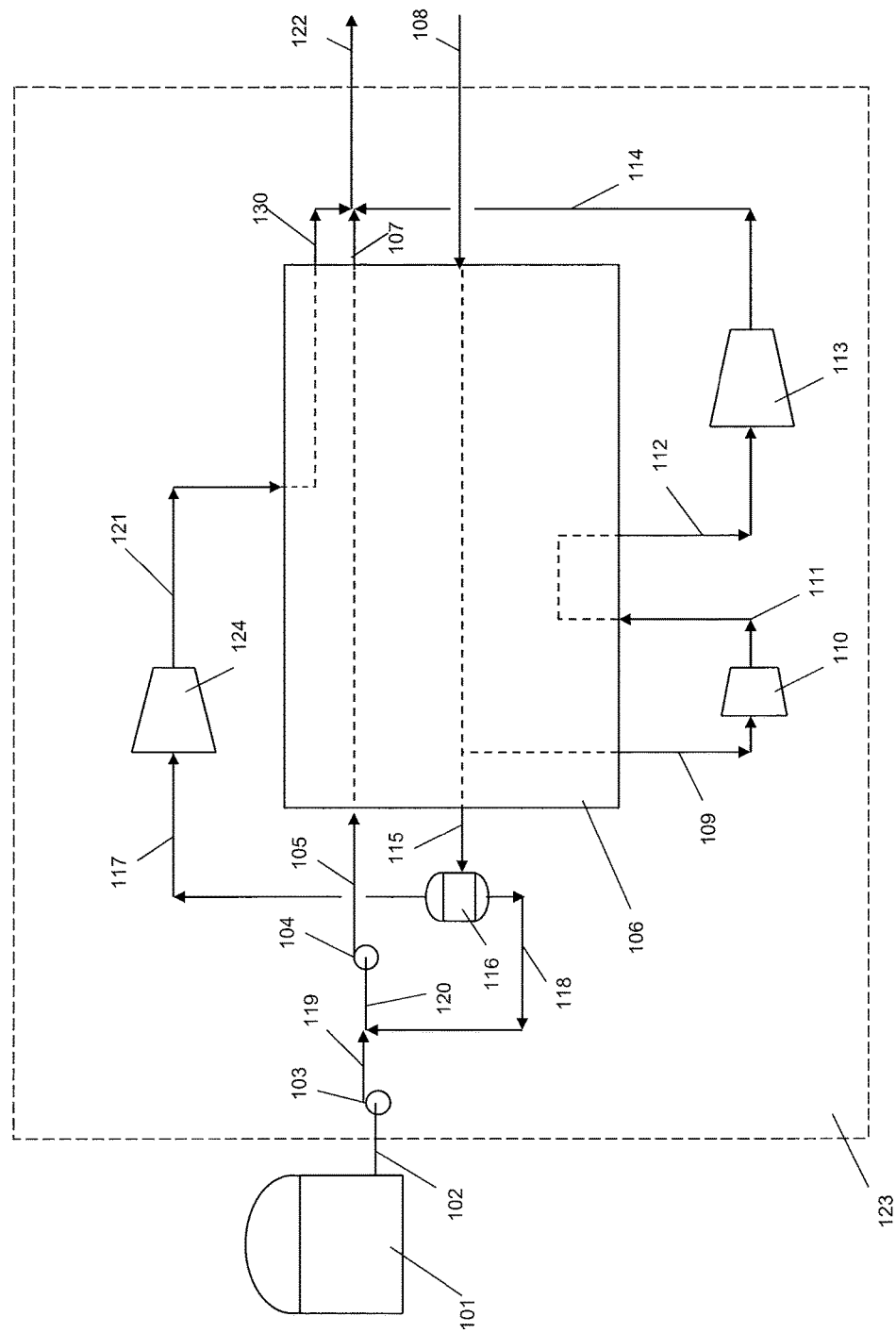
FIG. 1 illustrates the efficient vaporization of liquid air, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "cold compression" means the method of mechanically raising the pressure of a gas stream that is lower in temperature than the ambient level feeds to the cryogenic separation system and returned to the system at a sub ambient temperature or about ambient temperature. The compressor performing the cold compression is called "cold compressor" and can be a single-staged or a multi-staged device.

The efficient vaporization of liquid air is described in FIG. 1. Liquid air produced in off-peak periods is stored in tank 101, which is usually at about atmospheric pressure. During peak loads, liquid air stream 102 is withdrawn from tank 101 to pump 103 and pump 104 to form high pressure liquid air stream 105. Stream 105 is vaporized and warmed in heat exchanger 106 to form first high pressure compressed air stream 107, which may be at about 56 bar. A compressed air stream 108 with a molar flow of about 4.3 times higher than the liquid air stream 102, at about 10.7 bar and about ambient temperature, is fed to exchanger 106 to be cooled down by the refrigeration provided by the vaporizing liquid air stream 105. Prior to the dew point of air, a second cooled compressed air stream 109 of the cooled air stream 108 is extracted from exchanger 106, which may be at about −137° C. and fed to second cold compressor 110 which boosted its pressure to about 13 bar to form second cold compressor exhaust stream 111. Because of compression heat, the temperature of 111 is about −128° C. Stream 111 is then further warmed in exchanger 106 to yield intermediate warmed compressor exhaust stream 112 at about −85° C., which is the compressed by a fourth cold compressor 113 to yield second exhaust stream 114 at about 56 bar and at ambient temperature.

The remaining portion of the cooled stream 108 is further cooled in exchanger 106 to form further cooled compressed air stream 115 which may be partially condensed. The liquid fraction of stream 115 is quite small at about 6%. After a phase separation in separator 116, stream 115 at about −164° C. is separated in to a gaseous stream 117 and a liquid stream 118. Liquid 118 is mixed with the liquid stream 119 of pump 103 to yield stream 120, which is then pumped to 56 bar by pump 104 to form liquid stream 105. Stream 117 is compressed by a first cold compressor 124 to 56 bar to form first cold compressor exhaust stream 121 which is then warmed and mixed with the first high pressure compressed air stream from the high pressure liquid air stream 107 to yield exhaust stream 122 at about 56 bar. Therefore, from a liquid air stream 102 and a medium pressure air stream 108 at about 10.7 bar, and with a flow about 4 times larger, the combined stream (about 5 times larger than liquid air flow) is compressed to 56 bar with minimal power input from the 3 cold compressors. It is useful to note that the total power of the cold compressors represents only 34% of the energy required to compress the combined stream from 10.7 bar to 56 bar. It can be seen from this numerical example that the energy contained in the liquid can be restored efficiently by producing a much higher flow gas stream a pressure with approximately a pressure ratio of 5.

Figure 2:
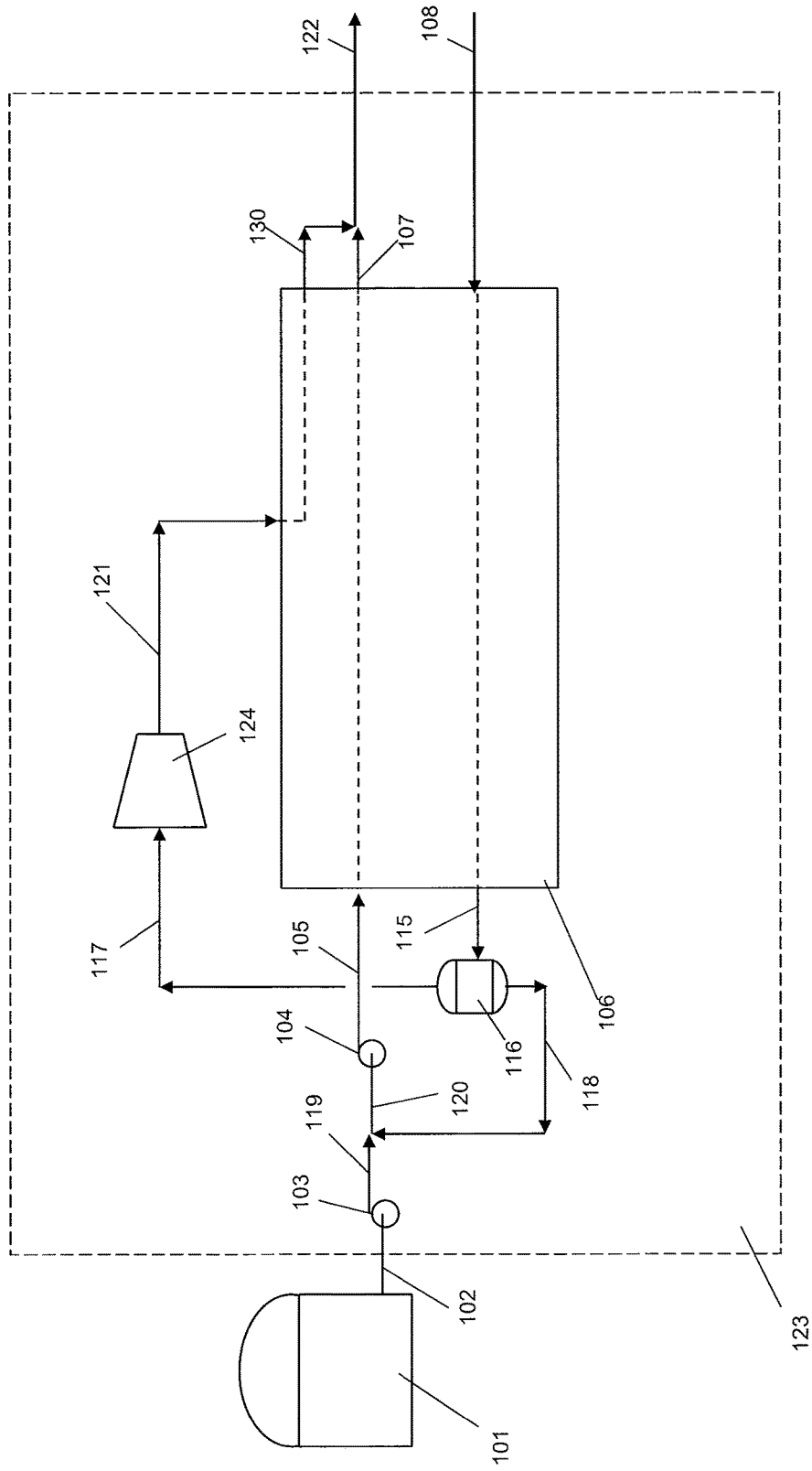
FIG. 2 illustrates another arrangement of the cold compressor in the vaporizer block, in accordance with one embodiment of the present invention.

To simplify the next description, the system of pumps, cold compressors, exchangers etc. are grouped in a "vaporizer block" 123 as shown in FIG. 1. FIG. 2 describes another arrangement of the cold compressor in the vaporizer block 123. In the interest of clarity, the element numbers are consistent with those used in FIG. 1. In this case, if the final pressure of the vaporized liquid air is high enough (about 200 bar abs), the discharge flow 121 of first cold compressor 124 can be at about ambient and there is no need to send it through exchanger 106. Stream 121 rejoins the vaporized liquid air 107 to form the combined exhaust stream 122.

Figure 3:
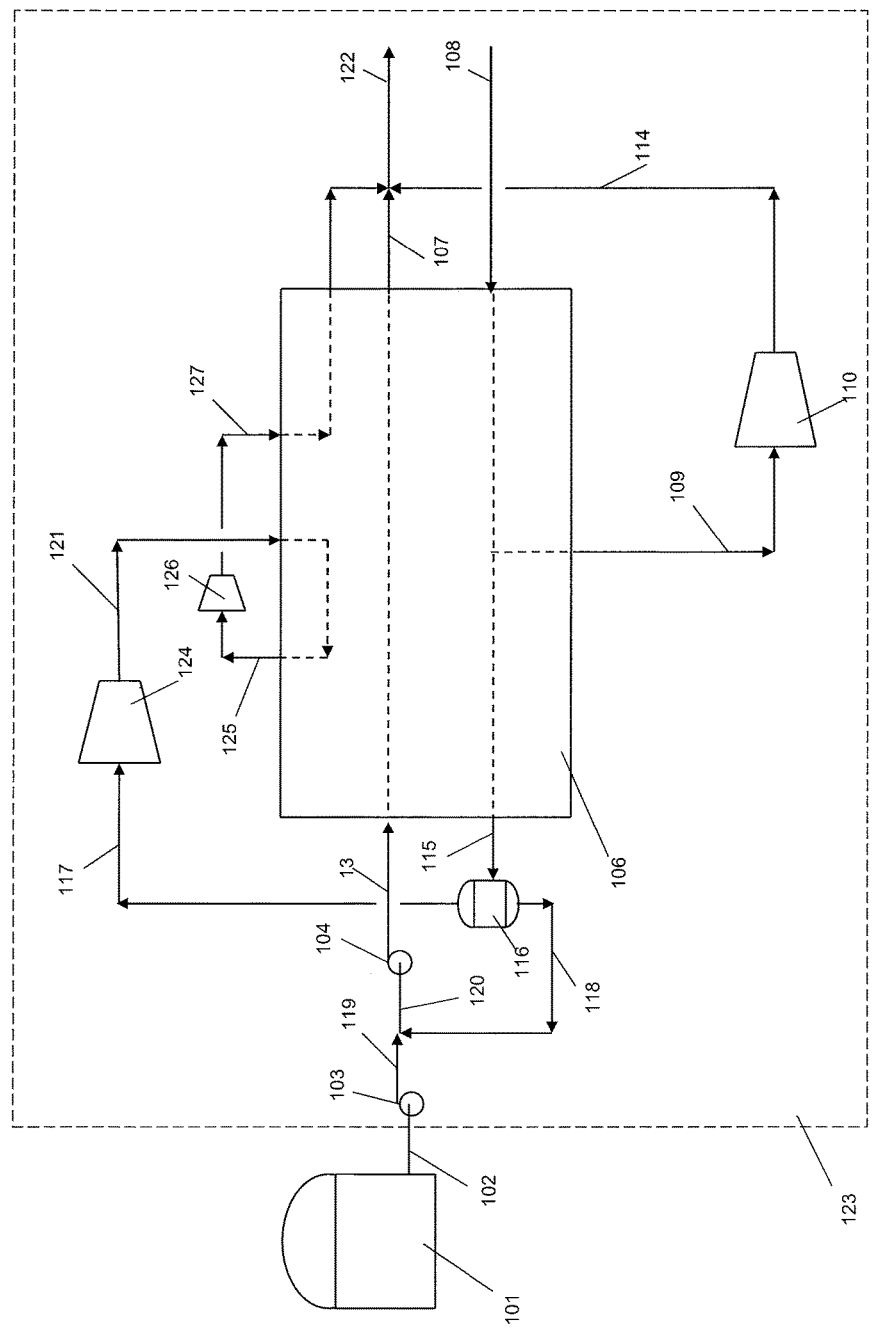
FIG. 3 illustrates another embodiment of the vaporizer block wherein the cold compression is performed in two compressors in series, in accordance with one embodiment of the present invention.

FIG. 3 is another embodiment of the vaporizer block 123. In the interest of clarity, the common element numbers are consistent with those used in FIG. 1. In this case, the cold compression of stream 117 is performed in 2 compressors in series. The discharge flow 121 of first cold compressor 124 is cooled in exchanger 106 to form first intermediate cooled compressor exhaust stream 125 which is then compressed further in a third cold compressor 126 to the final pressure. Prior to the dew point of air, a portion 112 of the cooled air stream 108 is extracted from exchanger 106 and fed to second cold compressor 110 which boosted its pressure to the final pressure exhaust stream 114. First exhaust stream 127 at the outlet of third cold compressor 126 rejoins the warmed vaporized liquid air and stream 114 to form the combined exhaust stream 122.

Figure 3A:
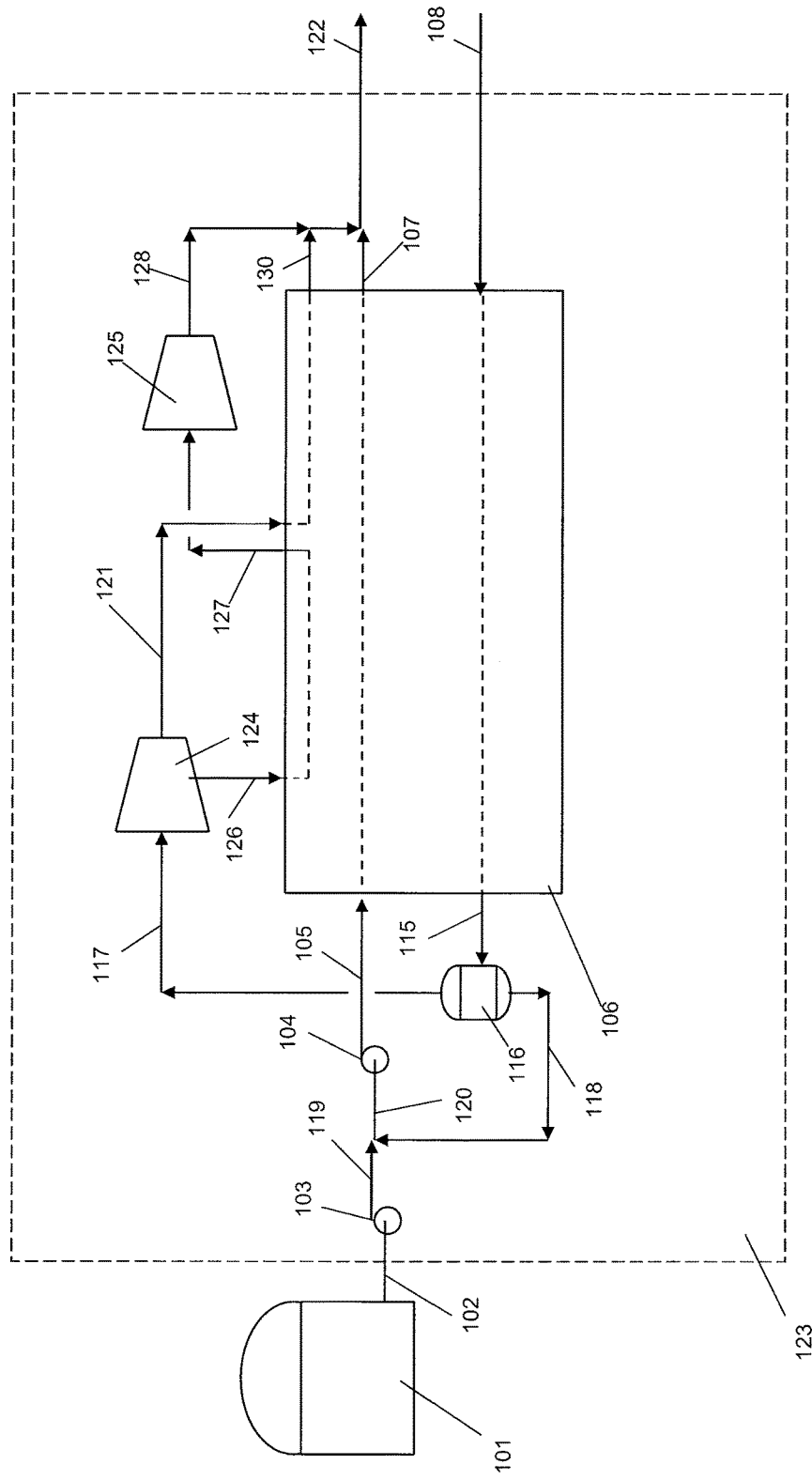
FIG. 3a illustrates another embodiment of the present invention.

The embodiment described in FIG. 3a can be used at lower pressure level than the other embodiments. Cooled air 117 is cold compressed in a multi-staged compressor 124. Stream 126 is extracted at an interstage of compressor 124, warmed in exchanger 126 and further compressed in compressor 125 to the required pressure. Feed air 108 can be at about 6.5 bar, after cooling it is compressed to about 83 bar in compressor 124 with side stream 126 extracted at about 42 bar.

Figure 3B:
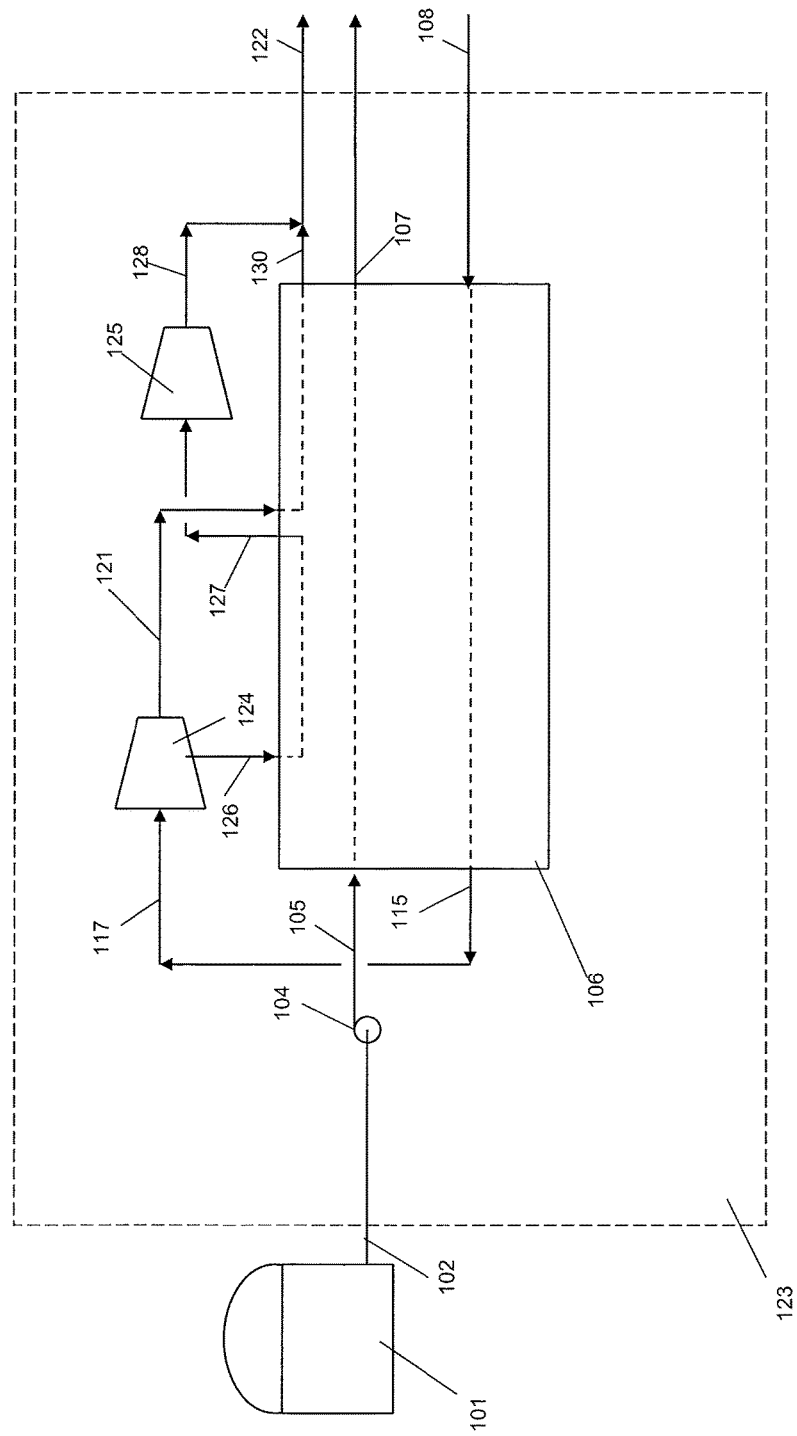
FIG. 3b illustrates another embodiment of the present invention.

In another embodiment described in FIG. 3b, the vaporized liquid can be separated from the compressed air cycle and extracted from the system as a pressurized product. Indeed, in many applications such as back-up vaporization, or peak shaving vaporization wherein the liquid product is vaporized to complement a gaseous production or to continue supplying gaseous product in case of outages. In this embodiment, the liquid 102 from storage tank 101 can be of liquid oxygen, liquid nitrogen or some other cryogenic liquids. This liquid is sent to exchanger 106 for vaporization as in other embodiments, however, this vaporization circuit is kept separated from the compressed air circuit such that the vaporized liquid product can be extracted from the system to supply a gas demand. Such compressed air circuit is then sustained by a closed loop air circuit driven by the recycle compressor as previously described. It is also feasible to replace air of the closed loop circuit with another gas such as nitrogen, argon, helium, or a mixture of gases for example. As such the refrigeration contained in the cryogenic liquid can be recovered and integrated into the energy storage concept even though the molecules of the stored gas are not subjected to the power recovery by expansion.

Figure 4:
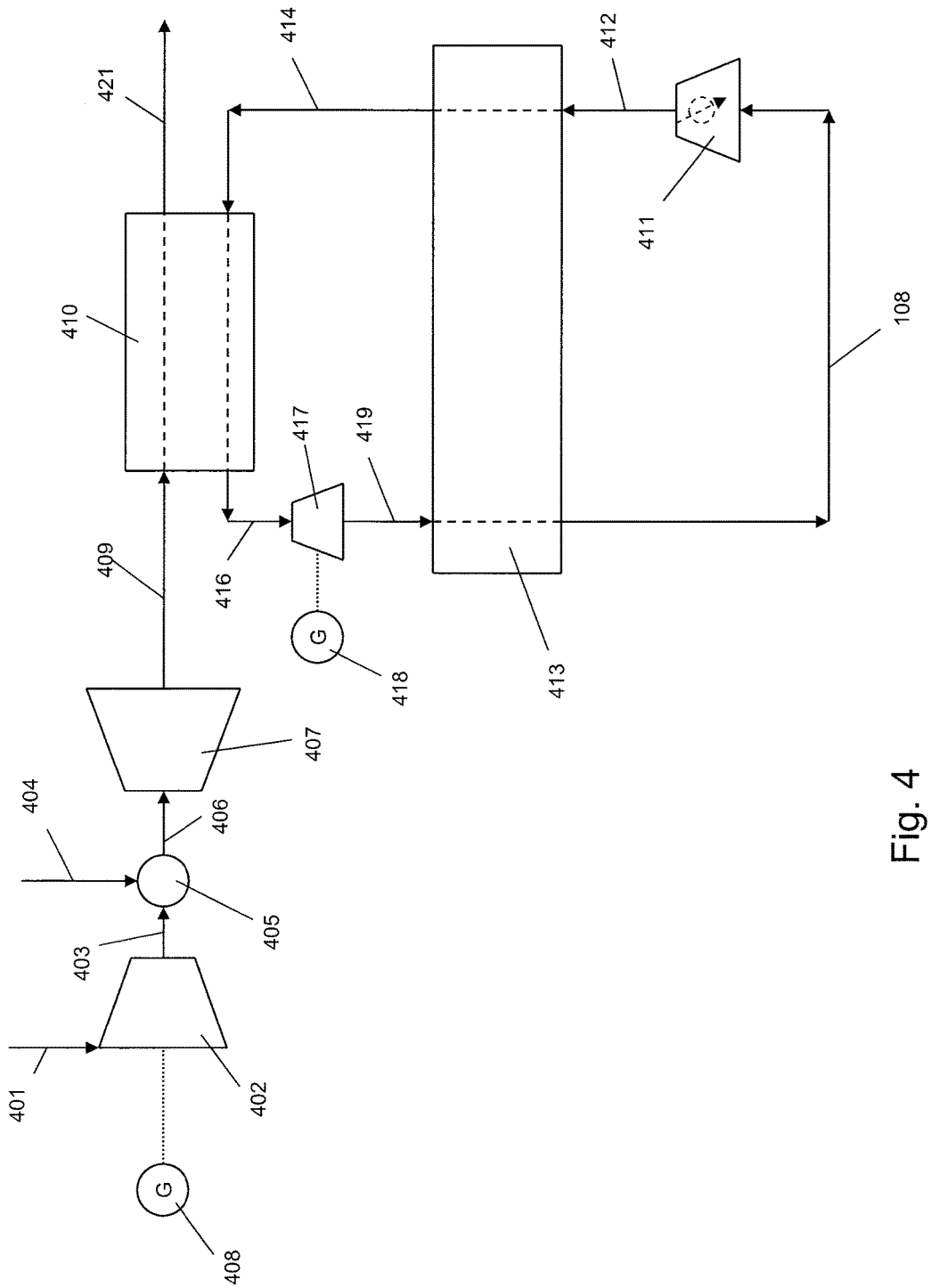
FIG. 4 illustrates a gas turbine with combined cycle running on compressed air instead of steam.

FIG. 4 describes a gas turbine with combined cycle running on compressed air instead of steam. In the interest of clarity, the common element numbers are consistent with those used in FIG. 1. In this case, atmospheric air 401 is compressed by the compressor 402 of the gas turbine to form a pressurized air 403, which is then mixed with fuel 404 and combusted in combustion chamber 405 to produce hot gas 406. Stream 406 at about 1200° C. and at a pressure of about 17 bar is then expanded in turbine 407. The net power produced by this gas turbine is used to drive a generator 408. The exhaust gas 409 of turbine 407 at about atmospheric pressure and 580° C. is sent to a heat recovery exchanger 410. A closed loop of compressed air is circulated by an isothermal compressor 411. Compression heat can be removed by, for example, cooling water or air cooling. Air stream 412 of about 50-60 bar from compressor 411 is first heated in heat exchanger 413 to yield heated air 414 which is then further heated in heat exchanger 410, be recovering the heat from the exhaust 409 of the gas turbine, to produce a hot compressed air stream 416. Stream 416 can then be expanded in a hot gas expander 417 to a pressure of about 10-11 bar to recover the energy. Expander 417 can drive a generator 418 to produce power. Exhaust 419 of expander 417 is sent to exchanger 413 wherein it exchanges heat with stream 412 to yield a returned compressed air stream 108, which is then re-compressed by compressor 411 to complete the loop.

The thermal efficiency of the compressed air combined cycle as described in FIG. 4 is marginally better (about 1-2%) than the simple cycle gas turbine. The efficiency of this compressed air combined cycle is much lower than the steam combined cycle by about 10%. Of course, the cost of the steam combined cycle is much higher. However, the compressed air combined cycle has a distinct advantage over the steam combine cycle because it can be improved significantly by integrating with a vaporizer block running with liquid air. This improvement is described in the following paragraphs.

Figure 5:
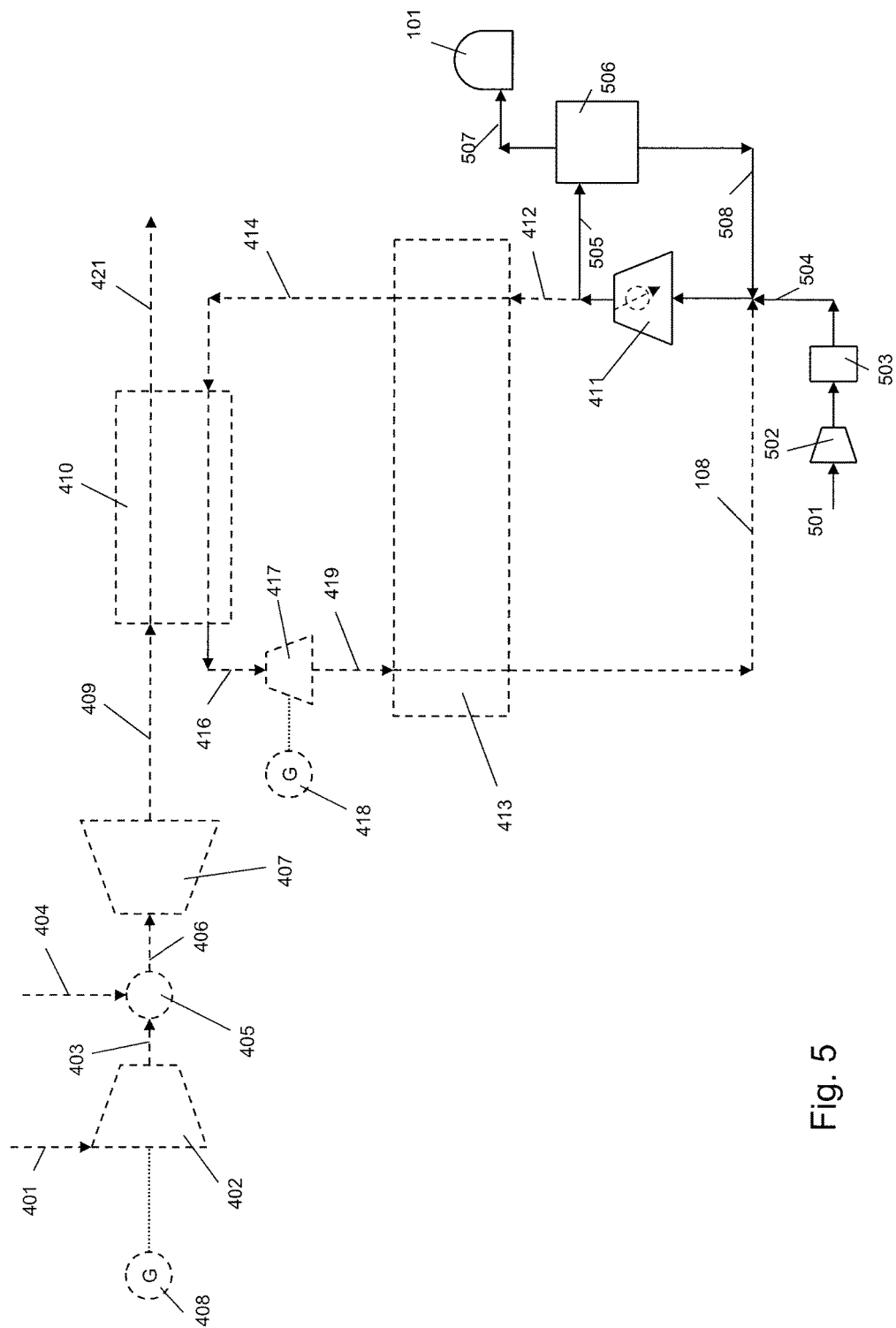
FIG. 5 illustrates a liquefaction plant to liquefy air, in accordance with one embodiment of the present invention.

As mentioned above, power during off-peaks is abundant and can be quite inexpensive. This power can be used to drive a liquefaction plant to liquefy air. FIG. 5 shows such an arrangement. In the interest of clarity, the common element numbers are consistent with those used in FIG. 1 and FIG. 4. In this case, during off-peaks, the gas turbine's power is not needed and it can be shutdown (equipment shown in dotted line). The isothermal compressor 411 of the compressed air combined cycle can be used as recycle compressor for the liquefaction plant. Atmospheric air 501 is compressed by compressor 502 and cleaned in the adsorber 503 for water and CO2 removal. Clean and dry air 504 from adsorber 503 is admitted into the recycle loop and further compressed by compressor 411 to yield the high pressure air stream 505. Stream 505 is sent to a liquefier unit 506, which can be of traditional design and equipped with turbo expander-compressor machinery, to produce a liquid air stream 507. Liquid air 507 is stored in storage tank 101.

Figure 6:
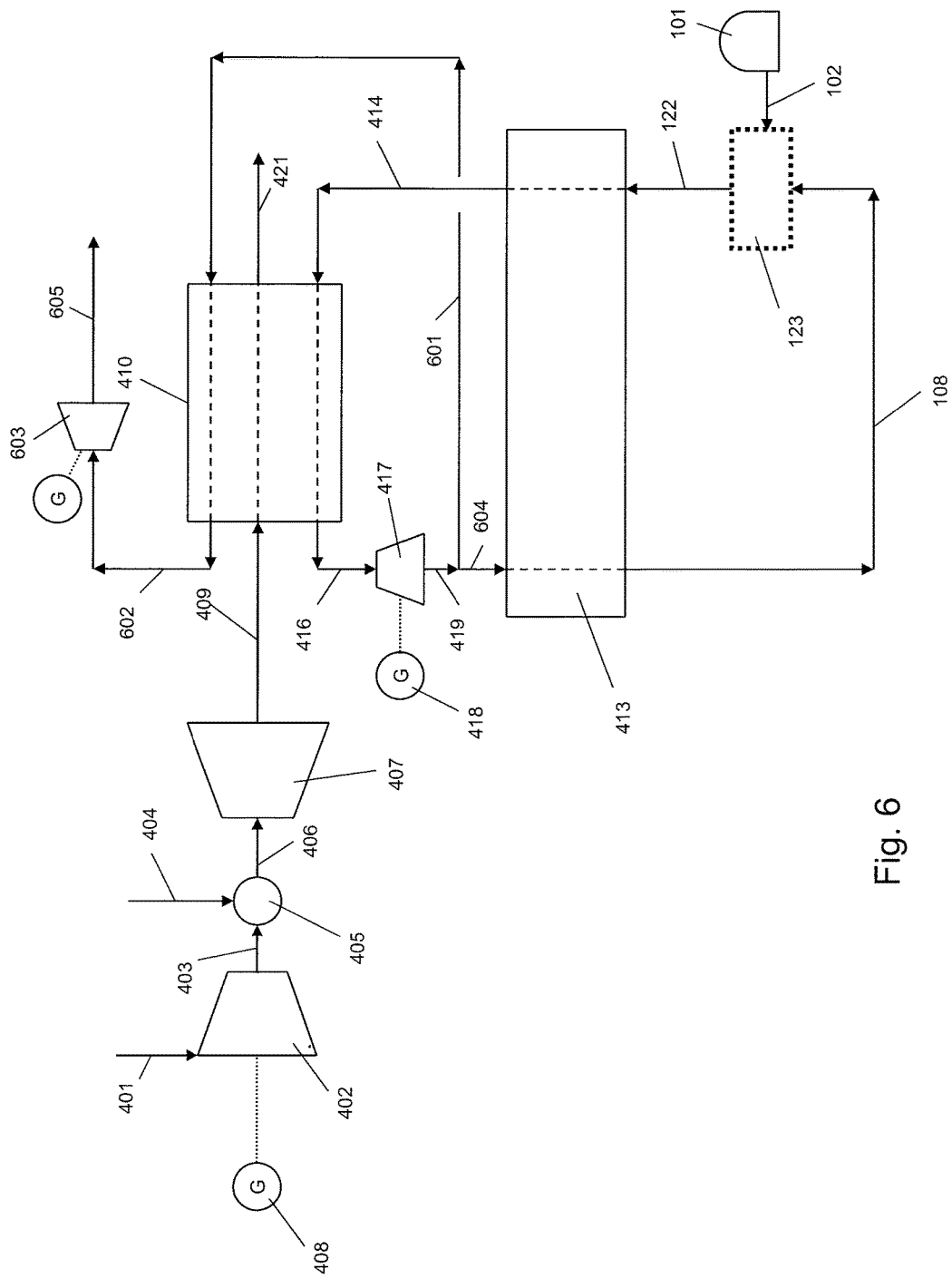
FIG. 6 illustrates the operation during the peak loads, in accordance with one embodiment of the present invention.

FIG. 6 describes the operation during the peak loads. In the interest of clarity, the common element numbers are consistent with those used in FIG. 1 and FIG. 4. In this case, liquid air 102 (produced in off-peak periods) from storage tank 101 is sent to vaporizer block 123 wherein it is combined with the returned stream 108 at 10.7 bar to yield the final compressed air stream 122 at about 56 bar, as described above. The final compressed air stream is then heated in exchangers 413 and 410 to form the hot compressed air stream 416 which is expanded in hot gas expander 417 to produce additional power. A portion 601 of the expanded gas stream 419 of expander 417, with a flow essentially the same as the liquid air flow 102, is reheated in exchanger 410 against the expander 407's exhaust gas to form a second hot gas stream 602 which is then expanded in a second hot gas expander 603 to produce additional power. The remaining portion 604 of stream 419 is cooled in exchanger 413 and returned to the vaporizer block 123 to complete the loop. The isothermal compressor 411 needed during the off-peak liquefaction or during the normal combined cycle mode can be shut down during the peak loads.

It can be seen that by vaporizing liquid air via the vaporizer block, additional air flow can be generated efficiently and can be used to recover the waste heat of the gas turbine's exhaust stream and to drive additional hot gas expanders for producing more power. This operation can be performed very quickly to respond to the demand changes of the grid. Since only low power input is needed for the cold compressors of the vaporizer block during peak loads, and none for the liquid production, a large fraction of this increase in power production can be fed to the power grid to boost the electricity output. And this without the high cost and slow response of the steam combined cycle. Such arrangement will complement nicely the simple cycle gas turbine setup.

Figure 7:
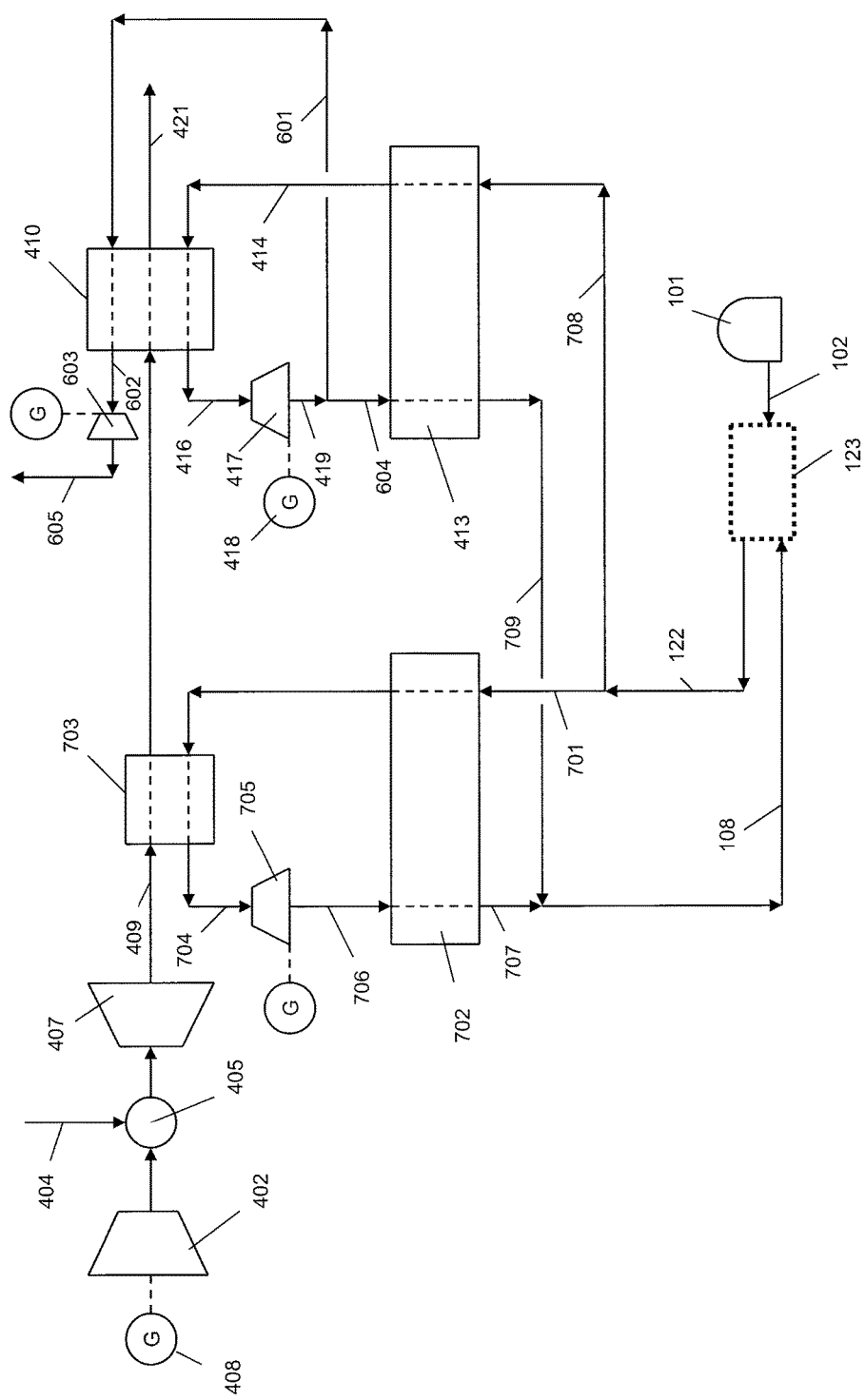
FIG. 7 illustrates one improvement of the base scheme of FIG. 6, in accordance with one embodiment of the present invention.

The embodiment of FIG. 7 is an improvement of the base scheme of FIG. 6. In the interest of clarity, the common element numbers are consistent with those used in FIGS. 1, 4, and 6. In this case, the final compressed air stream 122 from the vaporizer block 123 can be divided into 2 portions. Portion 701 is sent to a first combined cycle section wherein it is heated in exchangers 702 and 703 to yield a first hot gas stream 704 which is expanded in expander 705 to recover the power. Exhaust 706 of expander 705 is sent to exchanger 702 for heat recovery and yields a first portion 707 of the returned stream 108. Portion 708 of the final compressed air stream 122 is sent to a second combined cycle, in series with the first combine cycle. Hot exhaust gas 409 of gas turbine 407 is cooled in exchanger 703 after exchanging heat with the first combined cycle. Its temperature is still high and its heat content can be further recovered in the second combined cycle. Stream 708 is heated in exchangers 413 and 410 to yield a second hot gas stream 416 which is expanded in hot gas expander 417 for power recovery. Exhaust gas 419 of expander 417 is divided into 2 portions: the first portion 601, with a flow essentially the same as the liquid air flow 102, is heated in exchanger 410 to yield a third hot gas stream 602, which is expanded in expander 603 for power recovery. The second portion 604 of stream 419 is sent to exchanger 413 for heat recovery and constitutes the second portion 709 of the returned stream 108. Hence, the heat exchangers that are indirectly exchanging heat with the gas turbine exhaust (703, 410) are in series on the hot side, and they are in parallel on the air side. The heat exchangers (702, 413) are in parallel. This embodiment can be used to extract more heat from the exhaust gas of the gas turbine and to further increase the power generation of the system.

It can be seen from the above description of all three embodiments of the FIGS. 1, 2 and 3 that almost the totality of heat provided for the vaporization of the liquid air comes from the heat of compression of the cold compressors. The heat input of the liquid air pumps is rather small and only represents about 3% of the total power or heat input. The embodiments of the invention all share this vaporization by cold compression's heat as the common feature, which differentiates this invention from the prior art.

It should be noted that while the invention has been described in several different embodiments, it is obvious that some additional embodiments can be developed or added by the persons skilled in the art or familiar with the technology to further improve the invention without departing from the scope of this disclosure. For example, a portion of the compressed air from the compressed air combined cycle loop can be injected into the gas turbine and heated by the combustion of air and fuel to form a hot gas then expanded in the gas turbine to generate power.

What is claimed is:

1. A method of liquid air energy storage, wherein during a first mode of operation, the method comprises the steps of liquefying air in a liquefaction system to form a stored liquid air and storing said stored liquid air in a liquid air storage tank, wherein during a second mode of operation, the method further comprises the steps of:
   a) withdrawing the stored liquid air from the liquid air storage tank;
   b) vaporizing the stored liquid air in a vaporizer block at a second pressure against a first air stream at a first pressure to form a vaporized air stream and a first cooled air stream, wherein the second pressure is higher than the first pressure;
   c) compressing at least a portion of the first cooled air stream in a cold compressor to form a cold compressed air stream;
   d) warming the cold compressed air stream in the vaporizer block to form a warmed first air stream;
   e) combining the warmed first air stream with the vaporized air stream to form an exhaust stream, wherein the exhaust stream is at the second pressure;
   f) warming the exhaust stream in a second heat exchanger to form a warmed exhaust stream;
   g) further warming the exhaust stream in a third heat exchanger against a hot exhaust gas to form a hot compressed air stream, wherein the hot exhaust gas is produced by expanding a hot compressed gas originating from a combustion chamber;
   h) expanding the hot compressed air stream in a first hot gas expander to produce an expanded gas stream and power;
   i) cooling at least a first portion of the expanded gas stream in the second heat exchanger against the exhaust stream to form the first air stream; and
   j) recycling the first air stream to the vaporizer block for cooling against the stored liquid air in step b).

2. The method of liquid air energy storage as claimed in claim 1, further comprising the step of warming a second portion of the expanded gas stream in the third heat exchanger against the hot exhaust gas to form a heated second portion of the expanded gas stream.

3. The method of liquid air energy storage as claimed in claim 2, further comprising the step of expanding the heated second portion of the expanded gas stream in a second hot gas expander to produce additional power.

4. The method of liquid air energy storage as claimed in claim 3, wherein the power produced by the first and second hot gas expanders exceeds the power used to compress the first cooled air stream in the cold compressor.

5. The method of liquid air energy storage as claimed in claim 2, wherein the second portion of the expanded gas stream has a flow rate that matches a flow rate of the stored liquid air withdrawn from the liquid storage tank in step a).

6. The method of liquid air energy storage as claimed in claim 1, wherein the second pressure is at 56 bar.

7. The method of liquid air energy storage as claimed in claim 1, wherein the first pressure is at 10.7 bar.

8. The method of liquid air energy storage as claimed in claim 1, wherein the second period of time is during peak loads and the first period of time is during off-peak loads.

9. The method of liquid air energy storage as claimed in claim 1, wherein the first cooled air stream at least partially condenses in the vaporizer block during step b), wherein the method further comprises the step of b') separating the at least partially condensed fluid in a liquid gas separator to form a gaseous fraction and a liquid fraction, wherein the portion of the first cooled air stream that is compressed in the cold compressor in step c) is the gaseous fraction from the liquid gas separator.

10. The method of liquid air energy storage as claimed in claim 1, wherein the first air stream has a molar flow rate exceeding that of the stored liquid air withdrawn from the liquid air storage tank.

11. The method of liquid air energy storage as claimed in claim 1, wherein the first air stream has a molar flow rate of 4.3 times that of the stored liquid air withdrawn from the liquid air storage tank.

12. The method of liquid air energy storage as claimed in claim 1, wherein the first air stream is at ambient temperature prior to being used in step b).

13. The method of liquid air energy storage as claimed in claim 1, wherein the cold compressor operates at an inlet temperature below −137° C. and warmer than the dew point of the first cooled air stream.

14. The method of liquid air energy storage as claimed in claim 1, wherein the cold compressor has an outlet pressure of 56 bar.

15. A method of liquid air energy storage, wherein during a first mode of operation, the method comprises the steps of liquefying air in a liquefaction system to form a stored liquid air and storing said stored liquid air in a liquid air storage tank, wherein during a second mode of operation, the method further comprises the steps of:
   withdrawing the stored liquid air from the liquid air storage tank;
   vaporizing the stored liquid air in a first heat exchanger located in a vaporizer block at a second pressure against a first air stream at a first pressure to form a vaporized air stream and a first cooled air stream, wherein the second pressure is higher than the first pressure;

compressing a gaseous fraction of the first cooled air stream in a cold compressor to form a cold compressed air stream;

warming the cold compressed air stream in the first heat exchanger to form a warmed first air stream;

withdrawing an exhaust stream from the vaporizer block, wherein the exhaust stream comprises the warmed first air stream;

warming the exhaust stream in a second heat exchanger to form a warmed exhaust stream;

further warming the exhaust stream in a third heat exchanger against a hot exhaust gas to form a hot compressed air stream, wherein the hot exhaust gas is produced by expanding a hot compressed gas originating from a combustion chamber;

expanding the hot compressed air stream in a first hot gas expander to produce an expanded gas stream and power; and cooling at least a first portion of the expanded gas stream in the second heat exchanger against the exhaust stream to form the first air stream.

16. The method of liquid air energy storage as claimed in claim 15, further comprising the step of pressurizing a liquid fraction of the first cooled air stream to the second pressure and then vaporizing the liquid fraction in the first heat exchanger.

17. The method of liquid air energy storage as claimed in claim 15, wherein the exhaust stream further comprises the vaporized air stream.

* * * * *